United States Patent
Illakowicz

(10) Patent No.: US 9,926,770 B1
(45) Date of Patent: Mar. 27, 2018

(54) PORTABLE ALL-ELECTRIC SUBSEA DRIVE MODULE

(71) Applicant: OneSubsea IP UK Limited, London (GB)

(72) Inventor: Jan S. Illakowicz, Spring, TX (US)

(73) Assignee: OneSubsea IP UK Limited, Sugar Land, TX (US)

( * ) Notice: Subject to any disclaimer, the term of this patent is extended or adjusted under 35 U.S.C. 154(b) by 0 days.

(21) Appl. No.: 15/465,810

(22) Filed: Mar. 22, 2017

(51) Int. Cl.
| | |
|---|---|
| *E21B 34/04* | (2006.01) |
| *E21B 41/00* | (2006.01) |
| *E21B 47/12* | (2012.01) |
| *E21B 47/00* | (2012.01) |
| *H02K 5/10* | (2006.01) |
| *H02K 7/11* | (2006.01) |
| *H02K 11/33* | (2016.01) |
| *H02K 5/22* | (2006.01) |
| *H02K 5/132* | (2006.01) |
| *E21B 43/017* | (2006.01) |

(52) U.S. Cl.
CPC .......... *E21B 41/0007* (2013.01); *E21B 34/04* (2013.01); *E21B 47/0001* (2013.01); *E21B 47/12* (2013.01); *H02K 5/10* (2013.01); *H02K 5/132* (2013.01); *H02K 5/225* (2013.01); *H02K 7/11* (2013.01); *H02K 11/33* (2016.01); *E21B 43/017* (2013.01)

(58) Field of Classification Search
CPC .. E21B 34/04; E21B 41/0007; E21B 47/0001; E21B 47/12; H02K 5/10; H02K 5/132; H02K 5/225; H02K 7/11; H02K 11/33
See application file for complete search history.

(56) References Cited

U.S. PATENT DOCUMENTS

| | | | | |
|---|---|---|---|---|
| 6,595,487 | B2 * | 7/2003 | Johansen | E21B 33/0355 251/129.04 |
| 7,156,169 | B2 * | 1/2007 | Bartlett | E21B 33/043 166/338 |
| 7,216,715 | B2 * | 5/2007 | Reynolds | E21B 33/035 166/339 |
| 8,353,350 | B2 * | 1/2013 | Overfield | E21B 33/0385 166/250.01 |
| 8,686,681 | B2 * | 4/2014 | Stale | E21B 33/0355 320/101 |
| 8,997,875 | B2 * | 4/2015 | Bennett | H01M 6/36 166/351 |
| 9,222,555 | B2 * | 12/2015 | Morin | F16H 19/04 |

(Continued)

*Primary Examiner* — Matthew R Buck
(74) *Attorney, Agent, or Firm* — Rodney Warfford; Chris Streinz

(57) ABSTRACT

A subsea tool assembly includes a subsea tool and a subsea drive module connected to and configured to provide drive power to the subsea tool. The subsea drive module includes a housing configured for operation in a subsea environment, an electrical motor deployed in the housing, and an electrical power supply deployed in the housing. The electrical motor is configured to rotate a magnetic coupling which is sized and shaped to magnetically engage a corresponding magnetic coupling in the subsea tool. The electrical power supply is electrically connected to and configured to provide electrical power to the motor. Rotation of the magnetic coupling rotates the corresponding magnetic coupling in the subsea tool thereby providing drive power to the subsea tool.

15 Claims, 4 Drawing Sheets

(56) References Cited

U.S. PATENT DOCUMENTS

| | | | | |
|---|---|---|---|---|
| 9,470,054 | B2* | 10/2016 | Talgo | E21B 33/037 |
| 2015/0104328 | A1* | 4/2015 | Babbitt | F04D 25/0686 |
| | | | | 417/2 |
| 2015/0270768 | A1* | 9/2015 | Sinnerud | F01D 15/00 |
| | | | | 310/104 |
| 2016/0003001 | A1* | 1/2016 | Stinessen | E21B 33/0385 |
| | | | | 166/365 |
| 2016/0318591 | A1* | 11/2016 | Jamieson | H02J 7/025 |
| 2016/0333677 | A1* | 11/2016 | Westberg | E21B 43/128 |

* cited by examiner

PORTABLE ALL-ELECTRIC SUBSEA DRIVE MODULE

CROSS REFERENCE TO RELATED APPLICATIONS

None.

FIELD OF THE INVENTION

Disclosed embodiments relate generally to subsea equipment and more particularly to a portable, electrically powered, subsea drive module for powering subsea equipment.

BACKGROUND INFORMATION

Subsea tools and production equipment commonly require a power source and drive mechanism to perform their intended function(s). Such tools and equipment generally employ hydraulic power and drive mechanisms, for example, provided by one or more hydraulic lines in communication with a subsea termination unit or other source of pressurized hydraulic fluid. While such hydraulic power and drive mechanisms are serviceable, there remains room for further improvement.

For example, hydraulic supply lines are large and expensive and hydraulic equipment, such as pumps at the surface, are large and take up a significant amount of space on the platform or vessel. Moreover, hydraulic connections can leak hydraulic fluids into the subsea environment. The use of hydraulic power also tends to complicate delivery subsea tool delivery.

SUMMARY

A subsea tool assembly is disclosed. The assembly includes a subsea tool and a subsea drive module connected to and configured to provide drive power to the subsea tool. The subsea drive module includes (i) a housing configured for operation in a subsea environment, (ii) an electrical motor deployed in the housing, and (iii) an electrical power supply deployed in the housing. The electrical motor is configured to rotate a magnetic coupling which is sized and shaped to magnetically engage a corresponding magnetic coupling in the subsea tool. The electrical power supply is electrically connected to and configured to provide electrical power to the motor. Rotation of the magnetic coupling rotates the corresponding magnetic coupling in the subsea tool thereby providing drive power to the subsea tool.

In various disclosed embodiments, the subsea tool may include a connector seal retrieval and replacement tool, a connector hub cleaning tool, a chemical injection valve assembly, a subsea sampling tool, a production flow module, a subsea intervention tool, a torque tool, or a vibration monitoring tool.

The subsea drive module housing may optionally be sealed and pressure balanced internally for use in deep water subsea operations. The magnetic coupling may optionally be deployed in the housing and configured to engage the corresponding magnetic coupling in the subsea tool via a non-contact magnetic coupling. Alternatively, the magnetic coupling may optionally be deployed external to the housing and configured engage the corresponding magnetic coupling in the subsea tool via a contact magnetic coupling.

The subsea drive module may optionally further include an electronics module in electronic communication with the subsea tool and/or with a surface command center.

The disclosed embodiments may provide various technical advantages. For example, the disclosed subsea drive module embodiments may provide electrical and/or mechanical power to a subsea tool and therefore may obviate the need for hydraulic power and the use of hydraulic power lines. The elimination of hydraulics may advantageously provide for a clean, "zero leak" power source which in turn may reduce the environmental impact of subsea operations. The elimination of hydraulics may further reduce the size and complexity of subsea tools and simplify ROV tool delivery.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

For a more complete understanding of the disclosed subject matter, and advantages thereof, reference is now made to the following descriptions taken in conjunction with the accompanying drawings, in which.

DETAILED DESCRIPTION

Figure 1:
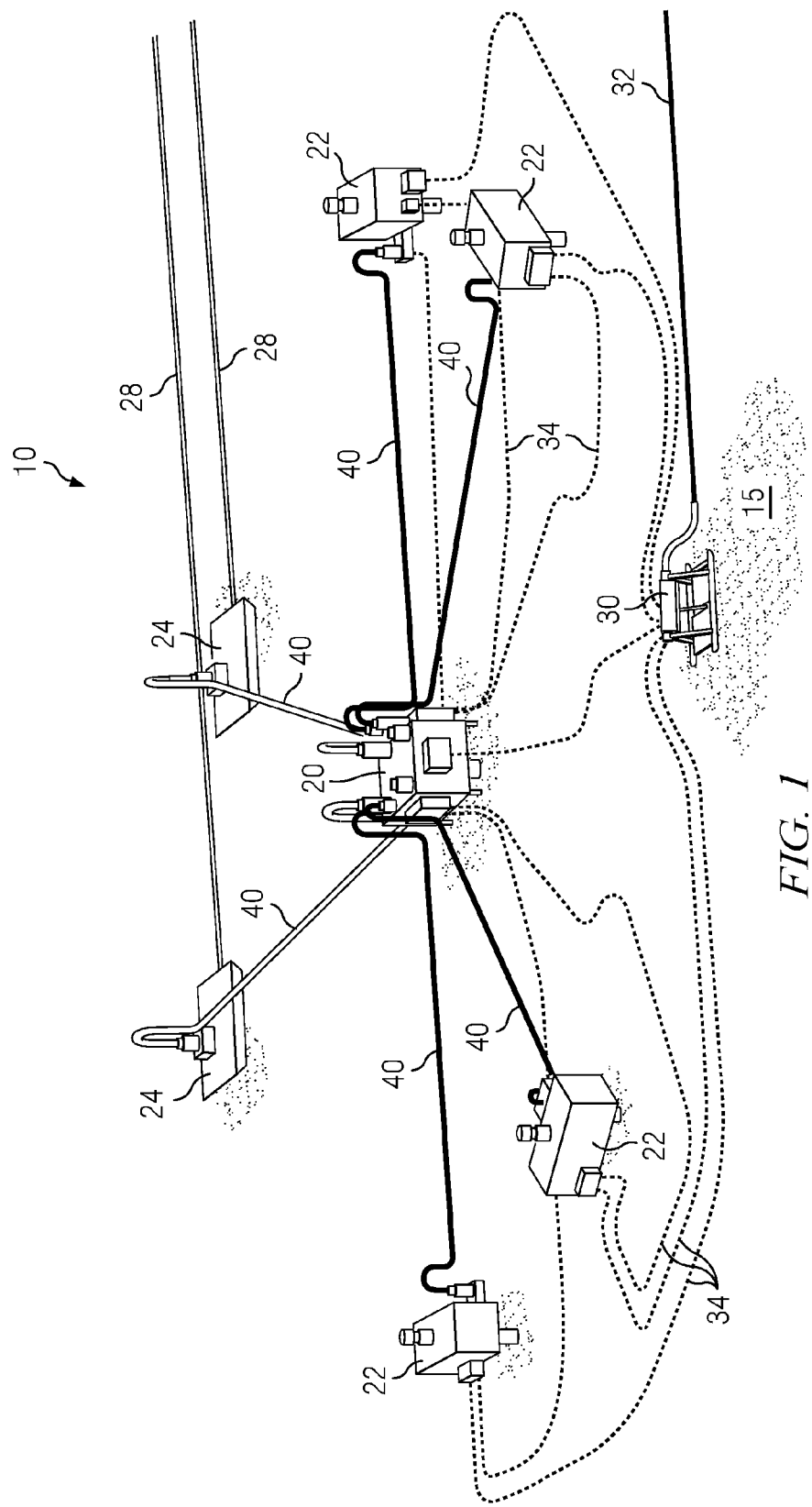
FIG. 1 depicts an example subsea production system drill center in which disclosed subsea drive module embodiments may be utilized.

FIG. 1 depicts an example subsea production system 10 (commonly referred to in the industry as a drill center) suitable for using various subsea drive module embodiments disclosed herein. The system 10 may include a subsea manifold 20 deployed on the sea floor 15 in proximity to one or more subsea trees 22 (also referred to in the art as Christmas trees). As is known to those of ordinary skill each of the trees 22 is generally deployed above a corresponding subterranean well (not shown). In the depicted embodiment, fluid communication is provided between each of the trees 22 and the manifold 20 via a flowline jumper 40. The manifold 20 may also be in fluid communication with other subsea structures, such as one or more pipe line end terminals (PLETs) 24. Each of the PLETs is intended to provide fluid communication with a corresponding pipeline 28. Fluid communication is commonly provided between the PLETs 24 and the manifold 20 via corresponding flowline jumpers 40.

FIG. 1 further depicts a subsea umbilical termination unit (SUTU) 30. The SUTU 30 may be in electrical and/or electronic communication with the surface via an umbilical line 32. Control lines 34 provide electrical and/or hydraulic communication between the various subsea structures 20 and 22 deployed on the sea floor 15 and the SUTU 30 (and therefore with the surface via the umbilical line 32).

It will be appreciated that the disclosed embodiments are not limited merely to the subsea production system configuration depicted on FIG. 1. As is known to those of ordinary skill in the art, numerous subsea configurations are known in the industry, with individual fields commonly employing custom configurations having substantially any number of interconnected subsea structures. Notwithstanding, remotely operated vehicles (ROVs) and/or autonomous underwater vehicles (AUVs) are commonly employed to service various subsea structures in the production system. A number of deliverable tools, such as seal retrieval and replacement tools and connector hub cleaning tools are commonly employed.

The aforementioned deliverable tools are conventionally powered using hydraulics, which can be problematic. For example, hydraulic connectors can be subject to leakage and therefore may introduce contaminants into the subsea environment. The use of hydraulic power also requires the use of dedicated hydraulic lines extending from the subsea tool to a pressurized hydraulic fluid source such as a SOTU. The hydraulic lines increase the weight and size of the subsea tool and may also become entangled with other subsea equipment during tool delivery (thereby significantly complicating the delivery process, especially in confined spaces).

Figure 2A:
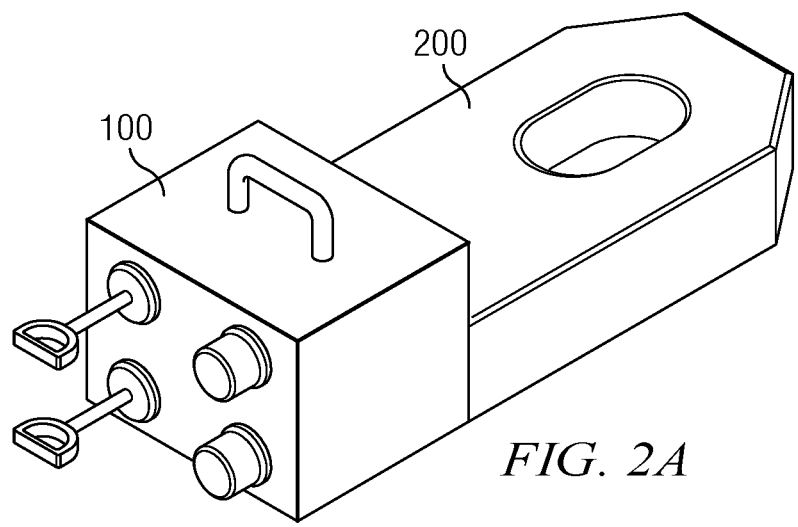
FIGS. 2A and 2B (referred to collectively herein as FIG. 2) depict one example of a disclosed subsea drive module connected with a subsea tool.
Figure 2B:
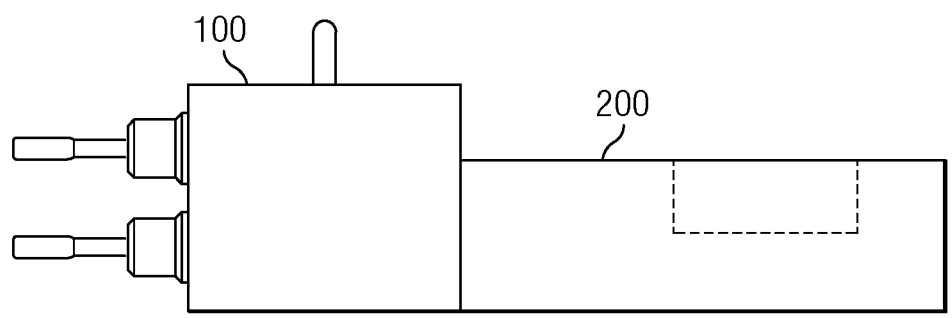

FIGS. 2A and 2B (collectively FIG. 2) depict one example of a disclosed subsea drive module 100 connected with a subsea tool 200. FIG. 2A depicts a perspective view of the module 100 and tool 200 while FIG. 2B depicts a side view. The subsea tool 200 may be configured to service a subsea structure. The subsea structures may include substantially any subsea structure, for example, including a manifold, a tree, a PLET, a SOTU, a pipeline, or a jumper as described above with respect to FIG. 1. The subsea tool 200 may likewise include substantially any suitable subsea tool, for example, a connector seal retrieval and replacement tool, a connector hub cleaning tool, chemical injection valves and assemblies, subsea sampling tools, production flow modules such as chokes and flow meters, intervention tools, torque tools, vibration monitoring tools and sensors, locks, overrides, or substantially any other tool that may be driven (or powered) by a remote electrical drive unit and delivered by a remotely operated vehicle (ROV) or autonomous underwater vehicle (AUV). It will be understood that use of the disclosed subsea drive module 100 is expressly not limited to any particular subsea structure or subsea tool 200.

It will be further understood that the disclosed subsea drive module embodiments are intended to function as a "self-contained" unit that provides electrical and/or mechanical power (e.g., via a magnetic coupling or via an electrical connector) to subsea tool 200. The subsea drive module embodiments may be configured to provide drive power to substantially any vertical or horizontal subsea tools such as vertical or horizontal connector tooling.

With continued reference to FIG. 2, the subsea drive module 100 is configured to provide drive power to the subsea tool 200. In one example embodiment, subsea drive module 100 may be magnetically coupled with a drive mechanism in the subsea tool 200 such that no direct mechanical connection is required (as described in more detail below with respect to FIGS. 3 and 4). In this way the subsea drive module 100 may further be sealed and pressure balanced internally for use in deep water subsea operations (e.g., to water depths exceeding 10,000 feet). In certain embodiments, the subsea drive module 100 may include various electronic instrumentation (not depicted) for providing instrumentation and communications support to the subsea tool 200 and/or other subsea systems (not shown). In another example embodiment, electrical power (e.g., DC battery power) may be provided to the subsea tool via a hardwired electrical connection.

Figure 3A:
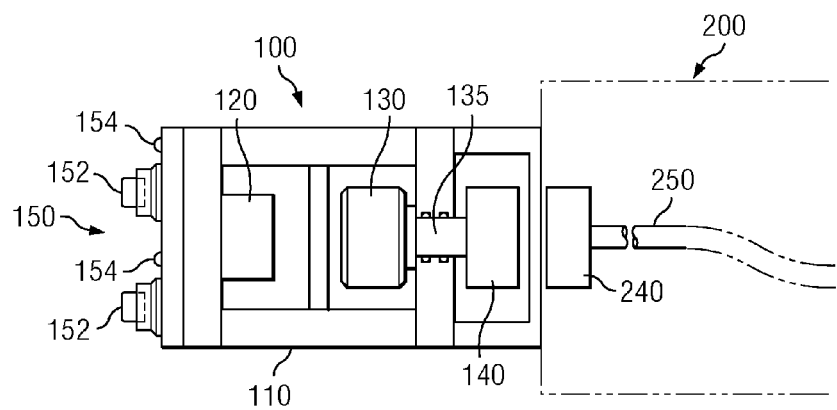
FIGS. 3A and 3B (referred to collectively herein as FIG. 3) depict example subsea drive module embodiments coupled with a subsea tool.
Figure 3B:
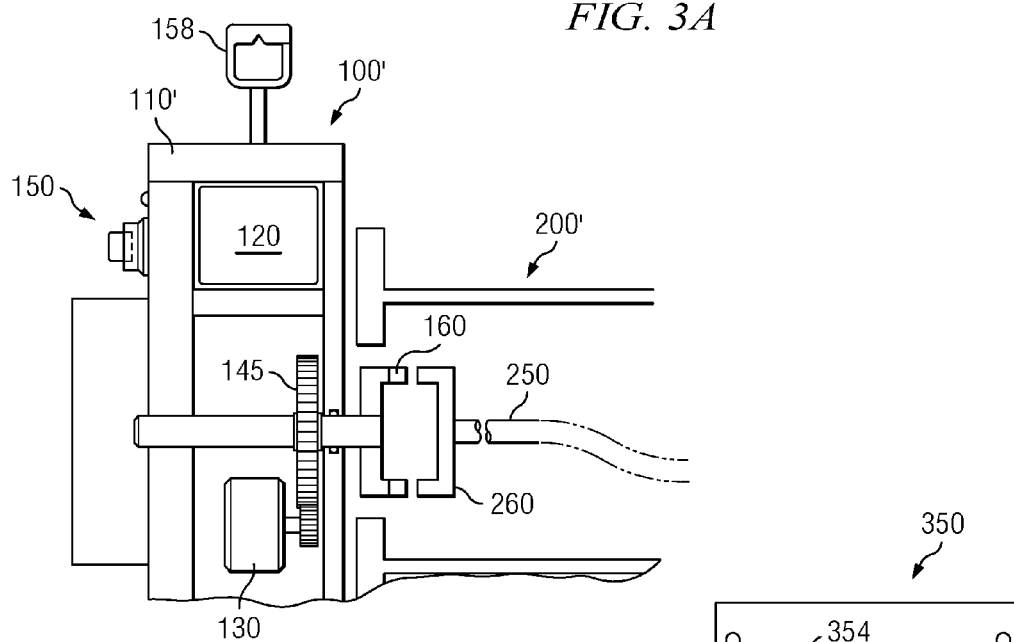

FIGS. 3A and 3B (referred to collectively herein as FIG. 3) depict example subsea drive module embodiments 100 and 100' magnetically coupled with a subsea tool 200. In FIG. 3A subsea drive module embodiment 100 includes an electrical power supply 120 (such as a battery pack) and an electrical motor 130 deployed in a pressure balanced housing 110. The electrical motor 130 is configured to drive a magnetic coupling 140 (e.g., via drive shaft 135) which in turn may drive a corresponding magnetic coupling 240 deployed in the subsea tool 200 via a noncontact magnetic coupling. Rotation of the magnetic coupling 240 (via electric motor 130 and magnetic coupling 140) may in turn rotate a rigid shaft or flex drive 250 which in turn powers the tool 200. The depicted subsea drive module embodiment 100 further includes an ROV interface 150 having a plurality of switches 152 (such as non-contact magnetic switches) and optical indicators 154 (such as light emitting diodes). The optical indicators may be configured to indicate an operational status of the subsea drive module and/or the subsea tool while the switches may be configured to control the function of the module (e.g. to turn the motor 130 on/off and/or to change the motor rotation rate) such that an ROV may interact with the subsea drive module 100 and/or the subsea tool 200.

In FIG. 3B subsea drive module embodiment 100' is similar to embodiment 100 in that it includes an electrical power supply 120 such as a lithium battery pack and an electrical motor 130 deployed in a housing 110'. The electrical motor 130 is configured to drive a magnetic coupling 160 via gearing mechanism 145. The gears 145 may be configured for example to provide increased torque to the coupling 160. Subsea drive module 100' differs from drive module 100 (FIG. 3A) in that it includes an external magnetic coupling (external to housing 110') that is intended to contact and magnetically lock to a corresponding magnetic coupling 260 in the subsea tool 200'. Subsea drive module 100' may further include an ROV interface 150 (e.g., as described above with respect to FIG. 3) and an ROV handle 158 that may enable an ROV to transport the module 100'.

Figure 4A:
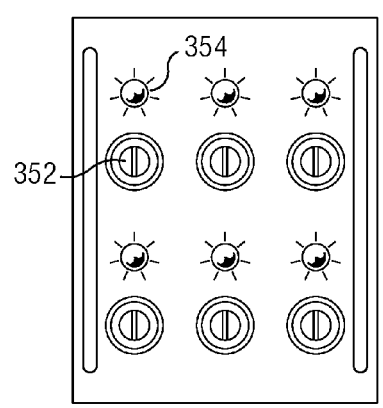
FIGS. 4A, 4B, and 4C (referred to collectively herein as FIG. 4) depict other example subsea drive module embodiments coupled with a subsea tool.
Figure 4B:
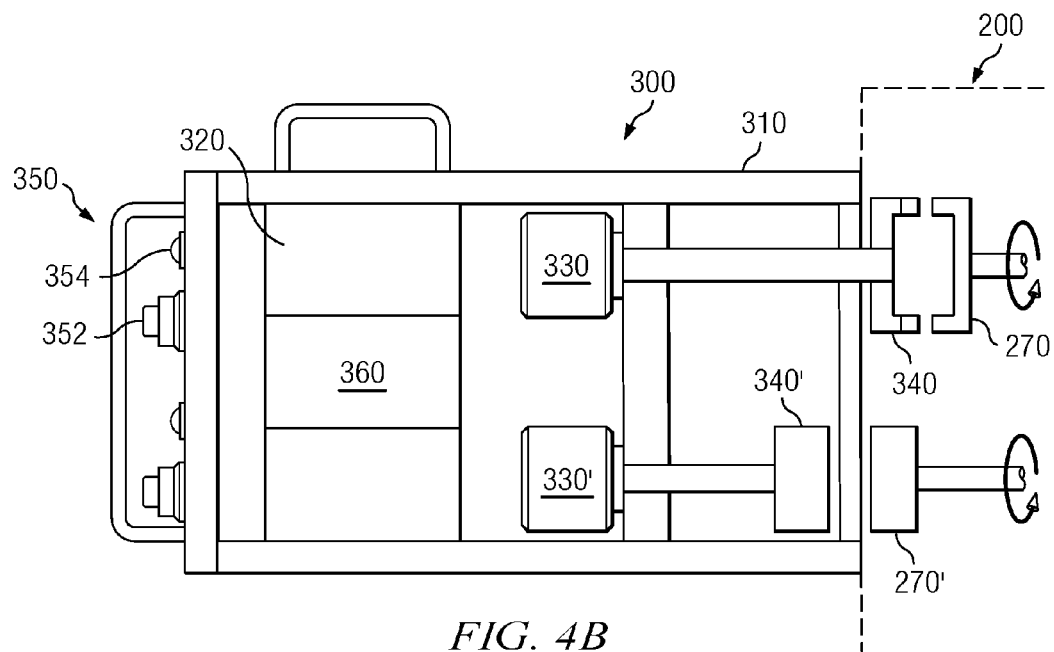
Figure 4C:
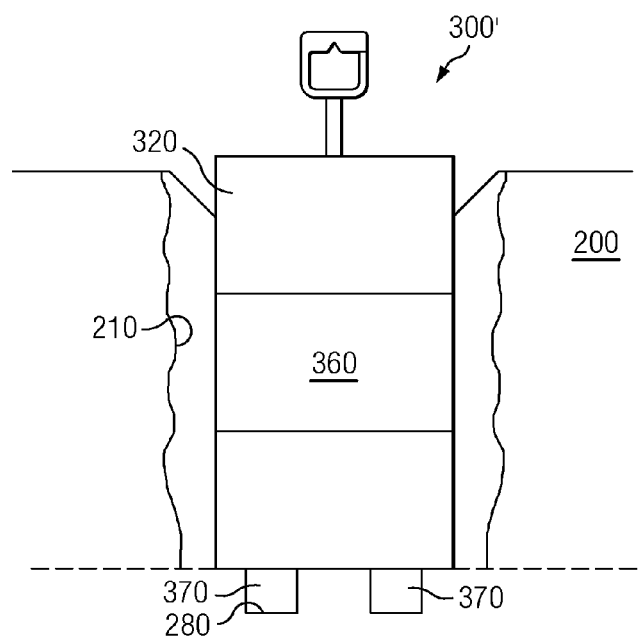

FIGS. 4A-4C (referred to collectively herein as FIG. 4) depict example subsea drive module embodiments 300 and 300'. The drive module embodiment 300 depicted on FIGS. 4A and 4B is similar to embodiment 100 (FIG. 3A) in that it is substantially horizontal and is configured for magnetic coupling with a subsea tool 200. Subsea drive module 300 includes an electrical power supply 320 such as a battery pack and first and second electrical motors 330 and 330' deployed in a housing 310 (e.g., a pressure balanced housing as described above). In the depicted embodiment, electrical motor 330 is configured to drive magnetic coupling 340 which is intended to contact and magnetically lock with corresponding magnetic coupling 270. Electrical motor 330' is configured to drive magnetic coupling 340' which is intended to drive corresponding magnetic coupling 270' via a noncontact magnetic drive.

With continued reference to FIGS. 4A and 4B, subsea drive module 300 further includes an electronics module 360 for providing electronic instrumentation and/or communications support to the subsea tool 200 and/or other subsea systems (not shown). As described above with respect to FIG. 3A, drive module 300 may further include an ROV interface panel 350 having a plurality of switches 352 (such as non-contact magnetic switches) and optical indicators 354 (such as light emitting diodes). The drive module 300 may further include one or more ROV handles for transporting the module 300 in the subsea environment.

FIG. 4C depicts a substantially vertical subsea drive module embodiment 300' deployed in a corresponding cavity 210 in a subsea tool 200 (such as a subsea tree). Drive module embodiment 300' includes an electrical power supply 320 that provides power to electronics module 360. The electrical power supply also provides power to electrical connectors 370 that are configured to mate with and to provide electrical power to corresponding electrical connectors 280 in subsea tool 200. In such an embodiment, the subsea drive module may provide electrical power (e.g., DC battery power) to the subsea tool 200. The electrical connectors may include substantially any suitable electrical connectors suitable for use in subsea environments such as conventional "wetable" connectors or inductive connectors. Such connectors are known in the industry and may provide a reliable connection in high pressure subsea environments. Subsea drive module 300' may further include one or more ROV handles and an ROV interface panel having a plurality of switches and optical indicators (not shown on FIG. 4C).

It will be understood that the electronics module 360 depicted on FIG. 4 may include substantially any suitable electronic hardware, firmware, and/or software. For example, the electronics module may include a communications interface configured to provide electronic communication between the subsea drive module and other subsea structures and/or a surface command center. The communications interface may be configured, for example, to provide two-way wireless or hard wired communication with the subsea tool, the surface command center, a subsea structure, and/or an ROV or AUV.

The electronics module 360 may further include an electronic processor (not shown), such as a microprocessor or a microcontroller, and may also include processor-readable or computer-readable program code embodying logic, including instructions for controlling the function of the subsea drive module as well as the subsea tool. The electronics module may further include other controllable components, such as other sensors, data storage devices, power supplies, timers, and the like. The electronics module may further optionally include volatile or non-volatile memory or a data storage device for downhole storage of various sensor measurements and subsea tool performance metrics. The disclosed embodiments are expressly not limited in these regards.

With continued reference to FIGS. 3 and 4, it will be understood that the disclosed subsea drive module embodiments may provide both an electrical power source and electronic instrumentation that is able to communicate with other subsea equipment and the surface command center. This may advantageously enable system functions such as docking location and positioning to be remotely monitored and controlled via the switches and optical indicators in the ROV interface. Known wireless and hardwired electronic communication methods may be employed to provide communication between the subsea tool, the subsea drive module, and the surface command center.

With still further reference to FIGS. 3 and 4, the disclosed subsea drive module embodiments are intended to provide electrical and/or mechanical drive power to a subsea tool. The disclosed subsea drive module embodiments are particularly advantageous when powering a deliverable subsea tool such as a connector seal retrieval and replacement tool, a connector hub cleaning tool, or substantially any other tool that may be delivered by a remotely operated vehicle (ROV) or autonomous underwater vehicle (AUV). It will be further understood that the disclosed subsea drive module embodiments may obviate the need to power such tools using hydraulics. The elimination of hydraulics may advantageously provide for a clean, "zero leak" power source which in turn may significantly reduce environmental impact.

The disclosed subsea drive module embodiments may further enable the development of "all-electric" electrically powered ROV tools such as prime movers, position monitoring instrumentation, and communications and operation logging tools. Such tools may be remotely controlled, monitored, and computerized via the disclosed subsea drive module.

Although a portable all-electric subsea drive module has been described in detail, it should be understood that various changes, substitutions and alternations can be made herein without departing from the spirit and scope of the disclosure as defined by the appended claims.

The invention claimed is:

1. A subsea tool assembly comprising:
a subsea tool; and
a subsea drive module connected to and configured to provide drive power to the subsea tool, the subsea drive module including (i) a housing configured for operation in a subsea environment, (ii) an electrical motor deployed in the housing, the electrical motor configured to rotate a magnetic coupling, the magnetic coupling sized and shaped to magnetically engage a corresponding magnetic coupling in the subsea tool, and (iii) an electrical power supply deployed in the housing, the electrical power supply electrically connected to the motor and configured to provide electrical power to the motor;
wherein said rotation of the magnetic coupling rotates the corresponding magnetic coupling in the subsea tool thereby providing the drive power to the subsea tool;
wherein the subsea tool is a connector seal retrieval and replacement tool or a connector hub cleaning tool.

2. The subsea tool assembly of claim 1, wherein the housing is sealed and pressure balanced internally for use in deep water subsea operations.

3. The subsea tool assembly of claim 1, wherein the magnetic coupling is deployed in the housing and configured to engage the corresponding magnetic coupling in the subsea tool via a non-contact magnetic coupling.

4. The subsea tool assembly of claim 1, wherein the magnetic coupling is deployed external to the housing and configured to engage the corresponding magnetic coupling in the subsea tool via a contact magnetic coupling.

5. The subsea tool assembly of claim 1, wherein the electrical power supply comprises a battery.

6. The subsea tool assembly of claim 1, wherein the subsea drive module further comprises an electronics module in electronic communication with the subsea tool.

7. The subsea tool assembly of claim 1, wherein the subsea drive module further comprises an electronics module configured to be in electronic communication with a surface command center.

8. The subsea tool assembly of claim 1, wherein the subsea drive module further comprises (iv) an external remotely operated vehicle (ROV) interface panel including a plurality of switches and optical indicators, wherein the switches are configured to control functionality of the subsea drive module and the optical indicators are configured to indicate an operational status of the subsea drive module.

9. The subsea tool assembly of claim 8, wherein the switches are configured to turn the motor on or off.

10. The subsea tool assembly of claim 8, wherein the switches are configured to change a rotation rate of the motor.

11. A subsea drive module configured to power a subsea tool, the subsea drive module comprising:
   a housing configured for operation in a subsea environment;
   an electrical motor deployed in the housing, the electrical motor configured to rotate a magnetic coupling, the magnetic coupling sized and shaped to magnetically engage a corresponding magnetic coupling in the subsea tool; and
   an electrical power supply deployed in the housing, the electrical power supply electrically connected to the motor and configured to provide electrical power to the motor;
   wherein the subsea drive module is configured to provide drive power to the subsea tool, wherein the subsea tool is a connector seal retrieval and replacement tool or a connector hub cleaning tool.

12. The subsea drive module of claim 11, wherein the housing is sealed and pressure balanced internally for use in deep water subsea operations.

13. The subsea drive module of claim 11, wherein:
   the magnetic coupling is deployed in the housing and configured to engage the corresponding magnetic coupling in the subsea tool via a non-contact magnetic coupling; or
   the magnetic coupling is deployed external to the housing and configured to engage the corresponding magnetic coupling in the subsea tool via a contact magnetic coupling.

14. The subsea drive module of claim 11, wherein the electrical power supply comprises a battery.

15. The subsea drive module of claim 11, wherein the subsea drive module further comprises an electronics module in electronic communication with the subsea tool and with a surface command center.

* * * * *